United States Patent

[11] 3,550,689

| [72] | Inventors | Marvin Lloyd Keck<br>Helena 59601, and<br>Glenn W. Clinard, 200 35th St. S., Great<br>Falls, Mont. 59401 |
|---|---|---|
| [21] | Appl. No. | 585,986 |
| [22] | Filed | Oct. 11, 1966 |
| [45] | Patented | Dec. 29, 1970 |
| [73] | Assignee | Glenn W. Clinard,<br>Great Falls, Mont. |

[54] ROD WEEDER
10 Claims, 4 Drawing Figs.

[52] U.S. Cl........................................... 172/44,
172/63, 172/106, 172/175
[51] Int. Cl..................................................... A01b 39/19
[50] Field of Search............................................ 172/44, 78,
395, 399, 105, 106

[56] References Cited
UNITED STATES PATENTS

| 2,531,557 | 11/1950 | Dayton.......................... | 172/78X |
| 2,920,706 | 1/1960 | Turner.......................... | 172/44 |
| 3,033,294 | 5/1962 | Edwards........................ | 172/44 |
| 3,101,786 | 8/1963 | Hunter et al.................. | 172/44 |

FOREIGN PATENTS

| R 12,687 | 10/1956 | Germany....................... | 172/106 |
| 633,740 | 12/1949 | Great Britain................. | 172/395 |

*Primary Examiner*—Robert E. Pulfrey
*Assistant Examiner*—Alan E. Kopecki
*Attorney*—Kimmel, Crowell & Weaver ABSTRACT: A rod weeder rotated by ground-engaging wheels and arranged so that the wheels can swing about a vertical pivot with the rods of the rod weeder being connected to the drive through universal joint connections. The wheels are also permitted to pivot vertically about a horizontal pivot.

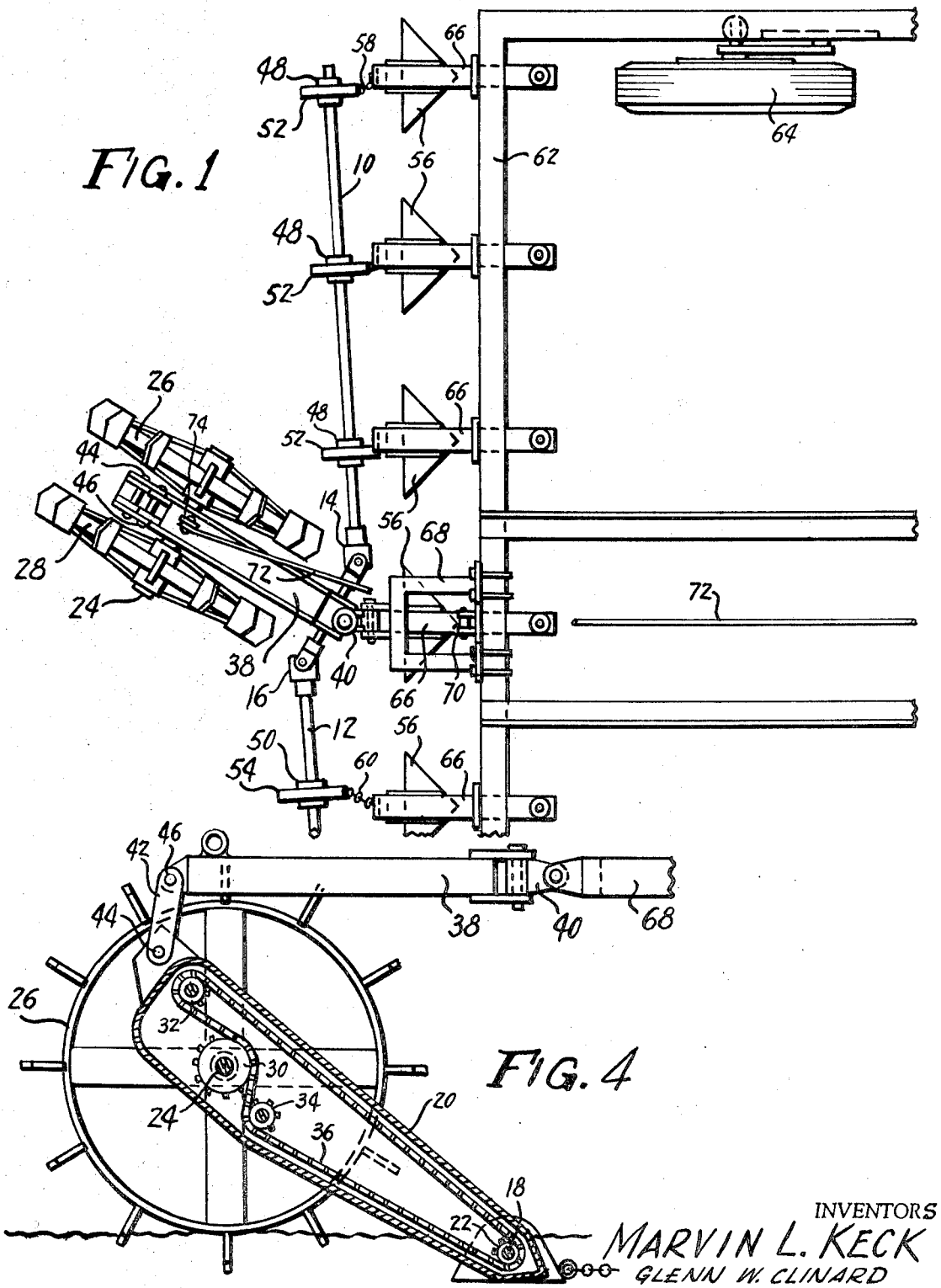

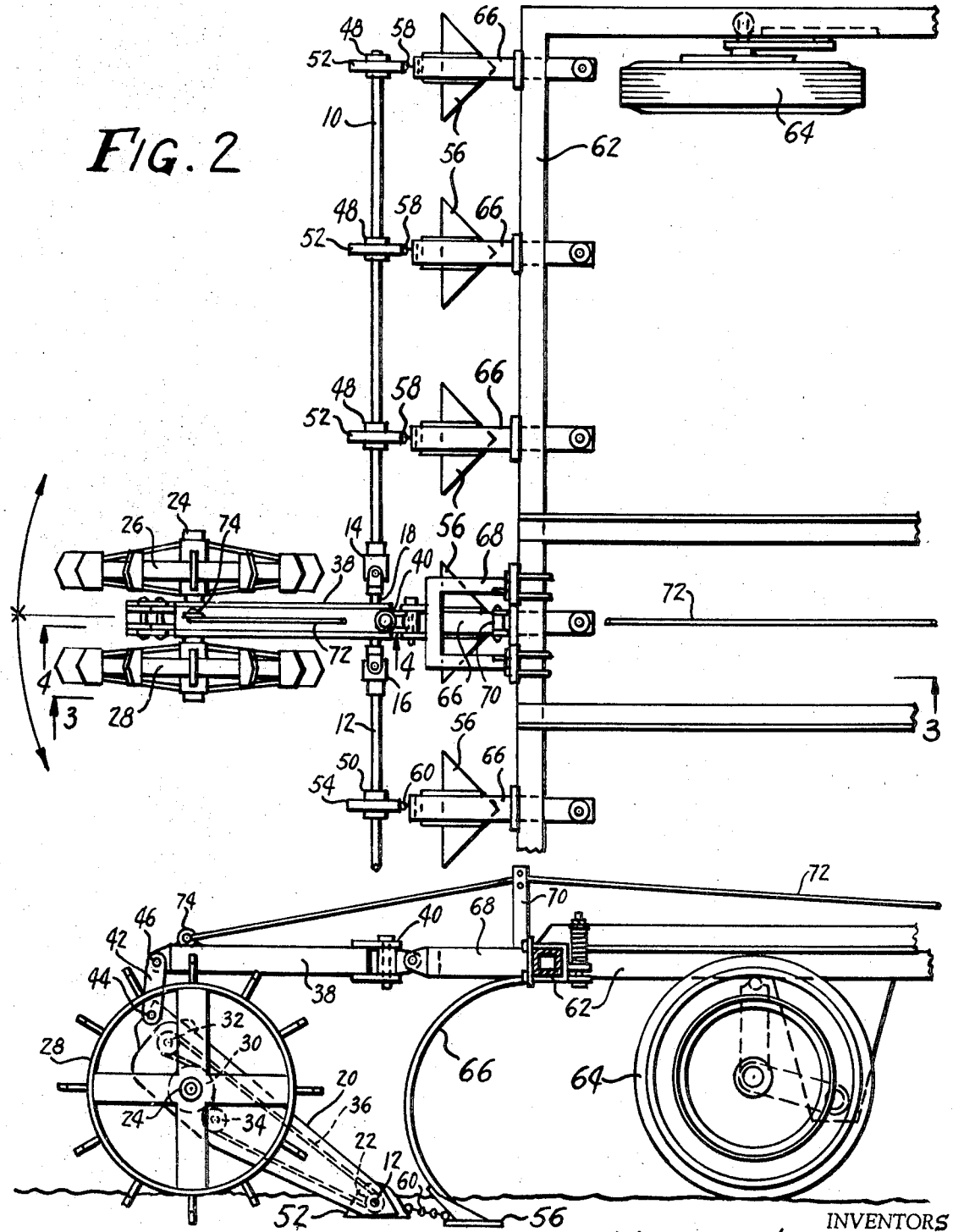

ROD WEEDER

Rod weeders of the type to which the present invention relates are commonly drawn behind chisel plows or other types of plows. Accordingly, the description and examples of the present invention are described with reference to a rod weeder which is drawn behind a chisel plow; however, it will be understood that the chisel plow forms no part of the present invention and that the present invention may operate independently of a chisel plow.

The rod weeders known in the prior art have in general operated quite satisfactorily; but difficulty has been experienced in designing rod weeders which may be turned either to the right or to the left without dragging sideways. Side drag will ridge the soil badly. In addition, side drag tends to stop the drive wheels from turning and frequently results in plugging the plow. This is particularly true in heavy stubble conditions. Accordingly, it is an object of this invention to provide a rod weeder which may be turned either to the right or to the left without being dragged sideways.

It is a further object of the present invention to provide a rod weeder which may be turned without interfering with the movement of drive wheels.

Difficulty has also been experienced in providing rod weeders which have adequate freedom to move up and down to assure constant ground contact by drive wheels in rough or uneven soil. Accordingly, it is an object of this invention to provide a rod weeder in which the weeder rod remains in constant contact with the ground and may move upwardly and downwardly relative to the drive wheel to permit the drive wheel to maintain constant contact with the ground.

It is a further object of this invention to provide a rod weeder which is maintained in constant rotation to thereby reduce the drag and to substantially lower power requirements.

A further object of the present invention is to provide a novel rod weeder in which the weeder rod is permitted to move relatively independently of the drive wheel and of the chisel plow or draft vehicle to which the rod weeder is connected.

It is a specific object of the invention to provide novel interconnection means for weeder rods and rod weeder drive mechanisms. Additional and important objects of the present invention will appear from the specification which follows and from the drawings to which reference is now made.

In the drawings:

FIG. 1 is a top plan view of the rod weeder of this invention showing its interconnection to a chisel plow and the position of the weeder rods during turning;

FIG. 2 is the rod weeder of the present invention showing its interconnection to a chisel plow during linear operation;

FIG. 3 is a side view of the rod weeder of the present invention showing its connection to a chisel plow, taken substantially along lines 3-3 in the direction of the arrows; and FIG. 4 is a side view of the rod weeder showing its connection to the chisel plow and showing in greater detail the driving head with the cover removed to show the drive mechanism of the present invention.

With reference now to the FIGS. in detail, in the preferred embodiment, the rod weeder of this invention comprises a pair of weeder rods 10 and 12, each of which are connected by universal joints 14 and 16 to the respective ends of a drive shaft 18. Drive shaft 18 is rotatably mounted in the lower end of driving head 20. A driven wheel 22, such as a pulley or sprocket, is secured to drive shaft 18 for rotatably driving shafts 10, 12. Driving head 20 also rotatably receives a first shaft 24, which may also serve as an axle for a pair of wheels 26 and 28. As shown in FIGS. 3 and 4, the driving head 20 extends forwardly and downwardly from axle 24. A drive wheel 30, which may also be a sprocket or pulley, is secured to axle 24, or to any desired shaft which is drivingly interconnected with wheels 26 and 28 which are ground-engaging wheels for being rotatably driven by engagement with the earth during movement of the wheels relative to the earth. In the preferred drive mechanism embodiment, a pair of idler wheels 32 and 34 which may be mounted on third and fourth idler shafts engage a continuous drive member 36, such as a belt or chain, which drivingly engages drive wheel 30 and driven wheel 32. It will be noted, that by means of idler wheels 32 and 34, the continuous drive member 36 engages the drive wheel 30 and the driven wheel 22 in a manner to rotatably drive the driven wheel, and the drive shaft, in a direction opposite the direction of rotation of the drive wheel, and of the ground-engaging wheels.

Ground-engaging wheels 26 and 28 may preferably be of the growser type for mulching the earth and for more positive engagement therewith and the driving head serves as a means mounting the wheel for being rotatably driven by engagement with the earth during movement of the wheels relative to the earth.

Means are also provided for connecting the wheel mounting means, and consequently the ground driven wheel, to a plow or draft vehicle for universal movement a spaced distance behind the plow. In a preferred embodiment, this interconnection means comprises a drawbar 38 and separable universal joint means 40 for interconnecting the front end of the drawbar to the plow, and means, such as link 42, pivotal connector 44 connecting one end of the link to the driving head and pivotal connector 46 connecting the other end of the link to the rear of the drawbar.

Weeder rods 10 and 12 are also connected to the individual plows on the chisel plow by a plurality of collars 48 and 50 which are rotatably received in bearings 52 and 54. Bearings 52 and 54 are connected to the individual plows 56 by chains 58 and 60. Plows 56 may be connected to frame 62, which is adjustably supported by wheels 64, by shafts 66 or by any conventional means.

A bracket 68 may conveniently be secured to frame 62 for connection with universal joint bracket 40. A lift cable tower 70 may also be secured to frame 62 for guiding lift cable 72 which is connected at 74 to drawbar 38 for lifting the ground-engaging wheels 26 and 28 when plows 56 are lifted and when it is desired to place the rod weeder in inoperative condition.

As best shown in FIG. 1, the rod weeder may turn virtually independently of the turning movement of the plow and thereby avoid any sideways dragging motion of the rod weeders. This independent turning action is made possible primarily by the novel driving universal joint arrangement between drive shaft 18 and weeder rods 10 and 12. This double jointed universal movement cooperates with the universal movement of the ground-engaging wheels a spaced distance behind the plows to permit essentially independent turning operation and the movement of the rod weeder. The chains 58 and 60 which interconnect weeder rods 10 and 12 to the chisel plows are quite flexible enough to permit rather large relative movements of the weeder rods 10 and 12 with respect to the chisel plows. Thus, the weeder rods 10 and 12 tend to turn independently of the chisel plow and to follow the chisel plow around as a turn is made. Since there is no sidewise dragging action, no ridges are formed at the exterior edges of turn and no depression in the soil is formed at the interior edges of turn. Also, since the weeder rods turn virtually independently of the chisel plow and of the drive wheels, there is no sidewise movement of the drive wheels and no tendency to jam the drive wheels and stop their motion. Generally, there is no tendency of the drive wheels to build up ridges. In addition, since the drive wheels are free to remain in positive contact with the ground at all times, the weeder rods are being rotatably driven at all times while the chisel plow is being pulled and less energy is required for pulling the rod weeders through the earth.

It will thus be apparent that the novel double jointed universal operation of the weeder rod of this invention functions in a different manner and possesses significant operational advantages over the rod weeders of the prior art.

It will be noted that while the invention has been described with reference to a specific embodiment, departures from the specific mechanisms and examples in the drawings and the specification may be made in the light of the teachings of this specification without departing from the spirit of the invention, the scope of which is defined in the appended claims. In addition, while in the specific embodiment the rod weeder is shown being drawn behind a chisel plow and interconnected therewith, it will be realized that the rod weeder may be drawn directly by a draft vehicle or by any desired type of plow or cultivating device.

We claim:

1. A weeding device for attachment to a cultivator, said device comprising: an arm having at one end a universal connection with a member adapted to be attached to a cultivator frame; said arm having at its opposite end a pivotal connection to a link, the opposite end of said link being pivoted to a weeder drive frame, said drive frame rotatably mounting an axle carrying an earth contacting drive wheel, a second axle rotatably mounted adjacent the opposite end of said drive frame; flexible drive means enclosed in said frame and transmitting rotation from said first to said second axle and a weeder bar connected to said second axle for rotation therewith.

2. In a rod weeder having a pair of weeder rods, means for rotatably driving the weeder rods, and vehicle means for moving the weeder rods through the earth, the improvement wherein the means for rotatably driving the weeder rods comprises:
   a wheel;
   means mounting the wheel for being rotatably driven by engagement with the earth during movement relative to the earth;
   means for connecting the wheel mounting means on said vehicle for universal movement a spaced distance behind said vehicle, said connecting means comprising: a drawbar; universal joint means for interconnecting the front end of the drawbar to said vehicle; and means interconnecting the wheel mounting means and the back end of the drawbar for relative vertical movement therebetween; and
   a drive connection between the wheel and the weeder rods for rotatably driving the rods when the wheel is rotatably driven comprising: a drive wheel driven by the wheel which drivingly engages the earth; a driven wheel; a continuous member engaging the drive wheel and the driven wheel for rotatably driving the driven wheel in a direction opposite the direction of rotation of the drive wheel; and a pair of universal joint drive connections between the driven wheel and weeder rods for rotating the weeder rods oppositely of the direction of rotation of the wheel which drivingly engages the earth, the pair of weeder rods extending outwardly from opposite sides of the driven wheel.

3. A rod weeder comprising:
   a weeder rod;
   a ground driven wheel for driving engagement with the ground;
   drive means including a drive shaft interconnecting the weeder rod and the ground driven wheel for rotatably driving the weeder rod when the ground driven wheel is moved relative to the ground;
   a drawbar for the rod weeder;
   a hitch for connecting the front end of the drawbar to a plow frame for relative angular movement therebetween; and
   means interconnecting the drawbar and the ground driven wheel for pulling the ground driven wheel and for permitting rotation of the ground driven wheel for rotatably driving the weeder rod and for permitting relative spacial movement between the drawbar and the ground driven wheel, said weeder rod comprising: a pair of weeder rods; and a pair of universal joints interconnecting the weeder rods with the drive shaft at the respective ends thereof.

4. A rod weeder comprising:
   a driving head;
   a first shaft journaled for rotation on said driving head;
   a ground-engaging wheel connected on said first shaft to effect rotation of the latter and to support said driving head;
   a drawbar;
   a link;
   means pivotally connecting one end of said link on said driving head;
   means pivotally connecting the other end of said link on one end of said drawbar;
   universal joint hitch means for connecting a second end of said drawbar on a movable vehicle;
   a weeder rod; and
   means on said driving head connecting said first shaft in driving relation with said weeder rod whereby rotation of said wheel effects rotation of said weeder rod.

5. The rod weeder of claim 4 wherein the weeder rod comprises:
   a pair of weeder rods;
   a drive shaft; and
   a pair of universal joints interconnecting the weeder rods with the drive shaft at the respective ends thereof.

6. The rod weeder of claim 5 wherein:
   the first shaft is an axle for the ground driven wheel;
   the driving head extends forwardly and downwardly from the axle to the proximity of the ground;
   the drive shaft is rotatably mounted in the lower portion of the driving head; and
   the drive means comprises means interconnecting the first shaft and the drive shaft for rotating the drive shaft in a direction opposite the direction of rotation of the first shaft.

7. A weeding device for attachment to a cultivator, said device comprising:
   a weeder drive frame;
   an arm having at one end a universal connection with a member adapted to be attached to said cultivator;
   a link having one end pivotally connected on said arm, the opposite end of said link being pivotally connected on said weeder drive frame;
   said weeder drive frame rotatably mounting an axle carrying an earth-engaging drive wheel;
   a second axle rotatably mounted adjacent the opposite end of said drive frame;
   drive means on said frame for transmitting rotation from said first to said second axles; and
   a weeder rod connected to said second axle for rotation therewith.

8. A weeding device as claimed in claim 7 wherein said frame includes means enclosing said drive means.

9. A weeding device as defined in claim 7 wherein said drive means includes a flexible component.

10. A weeding device as defined in claim 7 and means connected on said drawbar operable to pivot said wheels and, consequently, said weeder rod, about a normally horizontal axis for effecting the disengagement thereof from the earth.